United States Patent
Cui et al.

(10) Patent No.: US 12,497,340 B1
(45) Date of Patent: Dec. 16, 2025

(54) METHOD FOR RECOVERING PHOSPHORUS BASED ON CYCLIC HYDROTHERMAL CARBONIZATION OF WETLAND PLANTS

(71) Applicant: Tianjin University, Tianjin (CN)

(72) Inventors: Xiaoqiang Cui, Tiajin (CN); Junxia Wang, Tianjin (CN); Guanyi Chen, Tianjin (CN); Fan Yu, Tianjin (CN); Yuting Wang, Tianjin (CN); Jiangtao Wang, Tianjin (CN); Beibei Yan, Tianjin (CN); Zhanjun Cheng, Tianjin (CN); Fawei Lin, Tianjin (CN); Ning Li, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 19/238,312

(22) Filed: Jun. 13, 2025

(30) Foreign Application Priority Data

Jun. 14, 2024 (CN) .......................... 202410770175.4

(51) Int. Cl.
 *C05B 13/00* (2006.01)
(52) U.S. Cl.
 CPC .................................. *C05B 13/00* (2013.01)
(58) Field of Classification Search
 CPC ..................................................... C05B 13/00
 See application file for complete search history.

(56) References Cited

FOREIGN PATENT DOCUMENTS

CN 110201977 A 9/2019
CN 115254018 A * 11/2022 .............. B01J 20/20

OTHER PUBLICATIONS

Office Action issued in Chinese Application 202410770175.4 mailed on Sep. 9, 2024 (18 pages).
(Continued)

*Primary Examiner* — Wayne A Langel
(74) *Attorney, Agent, or Firm* — Osha Bergman Watanabe & Burton LLP

(57) ABSTRACT

The present invention relates to the technical field of solid waste resource utilization and environmental engineering, and in particular to a method for recovering phosphorus based on cyclic hydrothermal carbonization of wetland plants, comprising the following steps: (1) washing, drying, then crushing and sieving harvested wetland plants; (2) taking biomass powder for hydrothermal carbonization treatment to obtain a hydrothermal carbonization product; (3) performing solid-liquid separation for the obtained carbonization product; (4) continuing to use the obtained carbonization liquid as a liquid-phase medium and mixing with the biomass raw material for multi-stage cyclic hydrothermal carbonization; after the cyclic carbonization is ended, conducting solid-liquid separation to obtain phosphorus-rich carbonization liquid and cyclic hydrochar; and (5) adjusting the pH of the phosphorus-rich carbonization liquid to form and recover phosphorus crystal precipitates. The present invention effectively recovers phosphorus from the wetland plants, simultaneously realizes the resource utilization of the hydrothermal carbonization product of the wetland plants, reduces the impact of hydrothermal carbonization of biomass waste on environment, and effectively solves the problems of treatment and disposal of wetland plant residues.

1 Claim, 2 Drawing Sheets

(56) References Cited

OTHER PUBLICATIONS

Office Action issued in Chinese Application 202410770175.4 mailed on Dec. 17, 2024 (10 pages).
Cui, "Hydrothermal carbonization of different wetland biomass wastes: Phosphorus reclamation and hydrochar production" Waste Management 102 (2020) 106-113 (8 pages).
Acosta et al, "Optimizing resource efficiency through hydrothermal carbonization and engineered wetland systems: A study on carbon sequestration and phosphorus recovery potential" Journal of Cleaner Production 442 (2024) 140962 ( 11 pages).
Yixiao, "Study on recovery of phosphate from fermentation broth of large aquatic plants by calcium hydroxyphosphate crystallization" Conservation of Water Resources, vol. 33, Issue 6, Nov. 2017 ( 17 pages).
Notification to Grant Patent Right for Invention for Chinese Application 20241077015.4 mailed on Mar. 11, 2025 (3 pages).
Patentable or Allowable Claims Determined by the OEE for CN11845700B (2 pages).

\* cited by examiner

METHOD FOR RECOVERING PHOSPHORUS BASED ON CYCLIC HYDROTHERMAL CARBONIZATION OF WETLAND PLANTS

TECHNICAL FIELD

The present invention relates to the technical field of solid waste resource utilization and environmental engineering, and in particular to a method for recovering phosphorus based on cyclic hydrothermal carbonization of wetland plants.

BACKGROUND ART

Phosphorus is one of the essential macronutrients for plant growth. Application of phosphorus fertilizers is an effective way to ensure soil fertility and increase crop yields. However, as the main raw material for phosphate fertilizer production, phosphate rock is a non-renewable strategic resource, and its resource risks and ecological environment risks are prominent. Under this background, it is extremely necessary to develop alternative phosphorus resources!Eutrophication of the water bodies is a serious water quality problem that is widespread worldwide. The artificial wetland technology is currently widely used for efficient removal of nitrogen and phosphorus in eutrophic water bodies. Under natural conditions, after wetland plant residues decay and decompose, nutrient elements (including N, P, organic matter, etc.) carried by the residues will return to the water body again to participate in the biogeochemical cycle of the nutrient elements, thereby causing secondary pollution. How to realize the resource recovery of these wetland plants is of vital importance for preventing secondary pollution and is also the key to achieving phosphorus recovery in the water bodies. Compared with crop straws, wood, etc., the wetland plants have a higher potential for phosphorus recovery. Considering the inherent nature of wetland plant waste (such as high moisture content, multiple organic components and multiple phosphorus species), direct extraction of phosphorus from raw material is not a best solution. In addition, direct application of the wetland plant biomass may also lead to the problems of the introduction of pathogenic bacteria, rapid leaching of phosphorus, the threat of heavy metal, etc. Therefore, the recovery and effective reuse of phosphorus from phosphorus-rich wetland plants is a problem worthy of attention.

Hydrothermal carbonization is a novel technology for low-temperature preparation of hydrochar, and can directly treat solid waste with high moisture content. During the hydrothermal carbonization process of the wetland plants, phosphorus in the raw material is bound to migrate to a liquid-phase product. At present, most researches focus on the research and the modification of hydrochar, and relatively few analyses and researches are made on carbonization liquid. Because the liquid-phase product contains a large amount of organic matter and salts, how to properly treat the liquid-phase product is a problem worth considering. The water consumption and the carbonization liquid production of the hydrothermal carbonization process are huge. If the hydrothermal carbonization liquid is recycled and reused, it is expected to enrich and recover the nutrient elements in the carbonization liquid and significantly reduce the output of the carbonization liquid and subsequent treatment cost and difficulty, thereby reducing environmental pollution while achieving resource utilization.

At present, most researches focus on recovering phosphorus from animal faeces and sewage sludge by using electrochemical technologies and heat treatment technologies, and rarely focus on the research of phosphorus recovery from phosphorus-containing wetland plant residues. In addition, at present, most researches on hydrothermal carbonization products focus on the recovery of phosphorus in the hydrochar, and rarely focus on the researches on the efficient enrichment and reuse of phosphorus in the liquid-phase product. Adopting effective measures to efficiently enrich and recover phosphorus from the wetland plants is a win-win strategy for alleviating the shortage of phosphorus resources and treating the wetland plant waste, and has practical promotion significance for the industrial application of hydrothermal carbonization treatment of the wetland plants.

SUMMARY OF THE INVENTION

In view of the defect that the prior art lacks the recovery of phosphorus from the liquid-phase product in the hydrothermal recovery of phosphorus from the wetland plants, the present invention provides a method for recovering phosphorus based on cyclic hydrothermal carbonization of wetland plants.

Specific technical solutions are as follows: A method for recovering phosphorus based on cyclic hydrothermal carbonization of wetland plants comprises the following steps:
  (1) washing, drying, pulverizing and sieving harvested wetland plants;
  (2) adding biomass powder of the wetland plants to a liquid-phase medium for hydrothermal carbonization treatment to obtain a hydrothermal carbonization product;
  (3) performing solid-liquid separation on the carbonization product obtained in step (2) to collect a solid-phase product and a liquid-phase product;
  (4) mixing the carbonization liquid obtained in step (3), as the liquid-phase medium, with the biomass powder of the wetland plants for multi-stage cyclic carbonization; and after the multi-stage cyclic carbonization is completed, conducting solid-liquid separation to obtain cyclic hydrochar and phosphorus-rich carbonization liquid;
  (5) adjusting the pH of the phosphorus-rich carbonization liquid obtained in step (4) to form and recover phosphorus crystal precipitates.

Further, the wetland plants include common water body restoration plants such as *Ceratophyllum demersum* L., *Canna indica* L., *Acorus calamus* L. or Thalia *dealbata*.

Further, in step (2), the liquid-phase medium is either water or an acid solution.

Further, the acid solution includes one of sulfuric acid, hydrochloric acid and acetic acid, and the concentration of the acid solution is 0.5-2 mol/L.

Further, the liquid-phase medium is deionized water or a 1 mol/L sulfuric acid solution.

Further, in step (2), a mass ratio of the biomass to the liquid-phase medium is 1:5-20, a carbonization temperature is 200° C.-240° C., a holding time is 1-3 h, and a stirring speed is 80-120 rpm.

Further, the mass ratio of the biomass to the liquid-phase medium is 1:10, the carbonization temperature is 200° C., the holding time is 2 h, and the stirring speed is 100 rpm.

Further, in step (3), the solid-phase product is the hydrochar, and the liquid-phase product is the carbonization liquid.

Further, in step (4), a number of stages of the cyclic carbonization is 1-6.

Further, in step (4), a number of stages of the cyclic carbonization is 5.

Further, in step (5), the pH in a crystallization process is stabilized to 9-10, a stirring is conducted at a rotational speed of 80-120 r/min for 0.5-1.5 h; and a standing is conducted for 0.5-1.5 h upon completion of reaction.

Further, in step (5), the phosphorus-rich carbonization liquid is adjusted to a pH of 9.5, stirred at the pH at a rotational speed of 100 r/min for 1 h; after the reaction is ended, allowed to stand for 1 h upon completion of reaction, and the precipitates are collected, washed with distilled water 2-3 times, and dried in a constant temperature drying oven at 50° C. for 48 h or more than 48 h until the precipitates have a constant weight.

Further, a main phosphorus crystal product of the phosphorus-rich carbonization liquid is hydroxyapatite or struvite.

Compared with the prior art, the present invention has the following beneficial effects:

(1) The present invention conducts cyclic hydrothermal carbonization treatment for the wetland plants by recycling the liquid-phase product mixed with the biomass raw material, generates hydrothermal carbonization liquid with a high phosphorus concentration and realizes effective enrichment of phosphorus in the liquid-phase product, and the recycling of the hydrothermal carbonization liquid effectively reduces the discharge of carbonization waste liquid.

(2) Taking the phosphorus-rich carbonization liquid obtained by the present invention as a phosphorus source, without the need to add external metal, hydroxyapatite and struvite crystals as slow-release phosphate fertilizers can be obtained simply by adjusting the pH of the carbonization liquid. A phosphate recovery rate is greater than 99%, and the recovery of phosphorus and the resource utilization of the carbonization liquid are achieved, which has positive significance for finding alternative phosphorus sources and alleviating the pressure on phosphate ore resources.

(3) The present invention effectively recovers phosphorus from the wetland plants, simultaneously realizes the resource utilization of the hydrothermal carbonization products of the wetland plants, fully utilizes the nutrient elements in the liquid-phase product, reduces the environmental impact of hydrothermal carbonization of biomass waste, and effectively solves the problem of treatment and disposal of wetland plant residues.

(4) The crystal product obtained in the present invention has low content of heavy metal, significantly reduces the bioavailability and environmental risks, and is safer to serve as a phosphate fertilizer.

DETAILED DESCRIPTION OF THE INVENTION

Figure 1:
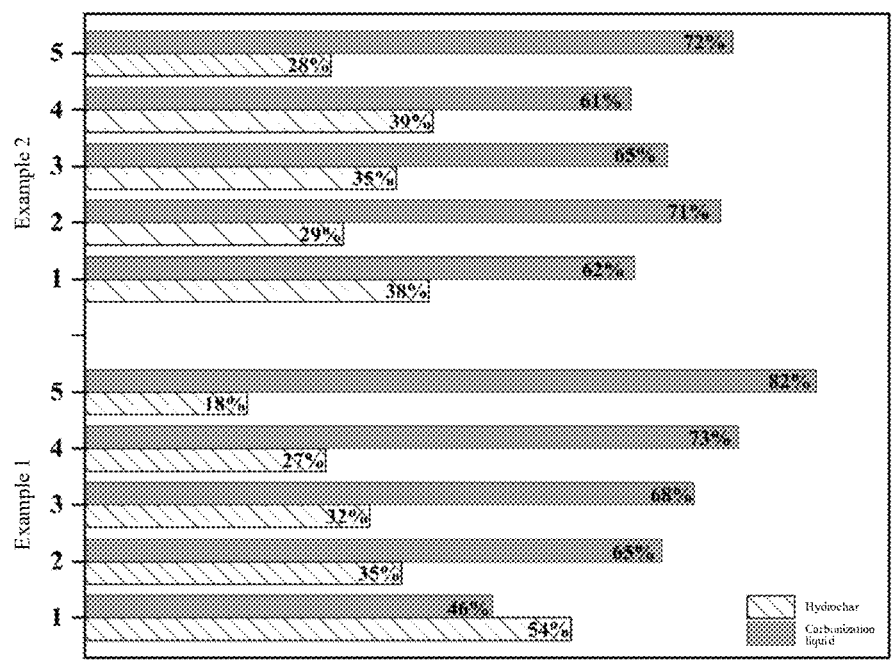
FIG. 1 is a schematic diagram of the recovery proportion of phosphorus in a cyclic carbonization product in an Example of the present invention, wherein digits on a vertical axis represent the number of cyclic carbonization.

To make those skilled in the art better understand the solutions of the present invention, the technical solutions of the present invention are clearly and fully described below in combination with specific embodiments. It should be indicated that the following detailed descriptions are exemplary, and are merely part of the embodiments of the present invention, not all of the embodiments.

Based on the embodiments in the present invention, all other embodiments obtained by those ordinary skilled in the art without contributing inventive labor shall belong to the protection scope of the present invention.

Unless otherwise specified, all technical and scientific terms used herein have the same meanings as those generally understood by those ordinary skilled in the technical field to which the present application belongs. Experimental materials used in the Examples of the present invention are all conventional experimental materials in this field and can all be purchased through commercial channels. Experimental methods without specified detailed conditions shall be carried out in accordance with conventional experimental methods or the operation manual recommended by the supplier.

Example 1

*Ceratophyllum demersum* L. harvested from constructed wetland was selected as raw material, washed with water until clean, air-dried for one week, dried in an oven at 80° C. to a constant weight and then ground with a crusher. The ground powder was screened through a 40-mesh sieve. The powder of *Ceratophyllum demersum* L. was taken as the raw material. The raw material was mixed with deionized water in a fixed ratio of 1:10, placed in a hydrothermal reactor, then heated to a preset temperature of 200° C., held for 2 h, and then naturally cooled to room temperature. Then, a solid-phase product and a liquid-phase product were separated. The solid-phase product was dried and then crushed to obtain hydrochar, and the liquid-phase product was carbonization liquid. The carbonization liquid was used instead of deionized water as a liquid-phase medium, and mixed with the raw material of *Ceratophyllum demersum* L. for five times of cyclic hydrothermal carbonization.

The above fifth-stage carbonization liquid was taken as test material, and stirred by a magnetic stirrer under room temperature conditions. The change of the pH value in the system was monitored online by a pH meter. By adding a NaOH solution and an HCl solution, the pH was adjusted to 9.5. The solution was stirred at this pH value at a rotational speed of 100 r/min for 1 h, stood for 1 h after the reaction was ended, and filtered to collect the precipitates. The precipitates were washed with distilled water by 2-3 times, and dried in a constant temperature drying oven at 50° C. for more than 48 h until the precipitates had a constant weight to obtain phosphorus crystal products.

It was determined that the total phosphorus content in the biomass raw material of *Ceratophyllum demersum* L. was 4.83 mg/g, the inorganic phosphorus content was 3.48 mg/g, and the organic phosphorus content was 1.35 mg/g.

In the present example, after the biomass was subjected to cyclic carbonization, the phosphorus content in the hydrothermal carbonization liquid was also increased accordingly, and there was a highly positive correlation therebetween (r=0.902, and P<0.01). In the present example, the total phosphorus content in the first-stage carbonization liquid was 160.79 mg/L, and the total phosphorus content in the fifth-stage carbonization liquid was 550.60 mg/L. This indicates that when the wetland plant *Ceratophyllum demersum* L. is conducted with cyclic hydrothermal carbonization treatment by recycling the liquid-phase product, the effective enrichment of phosphorus in the liquid-phase product can be achieved. In the present example, after the cyclic carbonization liquid was crystallized and precipitated, the inorganic phosphorus content in the supernatant was 1.68 mg/L, and the recovery rate of inorganic phosphorus reached 99.66%, which indicated that almost all the phosphate was recovered into the crystal product in the form of precipitates.

It can be seen from Table 1 that in the present example, after the cyclic carbonization of the biomass of *Ceratophyllum demersum* L., the total phosphorus content in the hydrochar generated was 4.85-6.27 mg/g, which was higher than the content in the biomass raw material. After the first-stage carbonization, the recovery proportion of total phosphorus in the hydrochar was 54.38%, which indicated that the distribution of phosphorus of *Ceratophyllum demersum* L. in the solid-phase product and the liquid-phase product in the hydrothermal carbonization process was comparable. As shown in FIG. 1, with the increase of the number of cycles, the recovery proportion of total phosphorus in the hydrochar showed a decreasing trend with the increase of the number of cycles, and the recovery proportion of total phosphorus in the hydrochar in the fifth-stage carbonization was only 18.15%. With the increase of the number of cycles, the recovery proportion of total phosphorus in the carbonization liquid was increased from 45.62% in the first-stage carbonization to 81.85%, and phosphorus was enriched in the hydrothermal carbonization liquid. It can be seen that the recycling of the carbonization liquid can promote the migration of phosphorus to the liquid-phase product.

Example 2

The basic working conditions of Example 2 were the same as those of Example 1. The only difference was that the initial liquid-phase medium for hydrothermal carbonization was 1 mol/L sulfuric acid solution.

It was determined that in the present example, after the cyclic carbonization of the biomass, the phosphorus content in the hydrothermal carbonization liquid was also increased accordingly, and there was a highly positive correlation between the total phosphorus content in the carbonization liquid and the number of cycles (r=0.886, and P<0.01). In the present example, the total phosphorus content in the first-stage carbonization liquid was 278.34 mg/L, and the total phosphorus content in the fifth-stage cyclic carbonization liquid was 540.47 mg/L. This indicates that when the wetland plant *Ceratophyllum demersum* L. is conducted with cyclic hydrothermal carbonization treatment by recycling the liquid-phase product, the effective enrichment of phosphorus in the liquid-phase product can be achieved. Wherein the inorganic phosphorus content in the fifth-stage carbonization liquid was 496.89 mg/L, accounting for 91.94%. The proportion of inorganic phosphorus was higher than that of the carbonization liquid obtained in a deionized water environment, which indicates that $H_2SO_4$ promotes the transformation of organic phosphorus to inorganic phosphorus during the hydrothermal carbonization process. The above results show that from the perspective of crystallization recovery of phosphorus, hydrothermal carbonization in a strong acid medium is more conducive to the crystallization recovery of phosphorus in the carbonization liquid. In the present Example, after the cyclic carbonization liquid was crystallized and precipitated, the inorganic phosphorus content in the supernatant was 0.63 mg/L, and the recovery rate of inorganic phosphorus reached 99.87%, which indicated that almost all the phosphate was recovered into the crystal product in the form of precipitates.

It can be known from Table 1 that the total phosphorus contents in the hydrochars obtained from the first two stages of carbonization in the present Example was 3.33 mg/g and 4.21 mg/g respectively, both of which were lower than that of the original biomass. In the present Example, after the first-stage carbonization, the recovery rate of total phosphorus in the hydrochar was 38.47%, which is significantly lower than that in the first-stage carbonization with the deionized water as the liquid-phase medium. This indicates that the acid liquid-phase medium is conducive to the migration of phosphorus to the liquid-phase product. With the increase of the number of cycles, the total phosphorus content in the hydrochar obtained from the first four stages of cyclic carbonization was increased to 8.55 mg/g. After the fifth-stage cyclic carbonization, the total phosphorus content in the hydrochar was decreased, and there was a positive correlation between the total phosphorus content in the hydrochar and the number of cycles (r=0.865, and P<0.01). In the first-stage hydrochar with sulfuric acid as the liquid-phase medium, more than 99.19% of phosphorus existed in the form of inorganic phosphorus. With the increase of the number of cycles, the proportion of organic phosphorus was gradually increased, but basically lower than that of the same-stage cyclic hydrochar with deionized water as the liquid-phase medium. The presence of sulfuric acid makes most of phosphorus in the raw material exist in the carbonization liquid in the form of inorganic phosphorus. The strongly acidic liquid-phase environment is more conducive to the dissolution of metal ions. With the increase of the number of cycles, a large amount of metal ions and phosphorus were accumulated in the liquid phase, and the metal ions were complexed with phosphorus and retained in the hydrochar through adsorption or precipitation effect. It can be seen from FIG. 1 that in the present Example, the recovery proportion of total phosphorus in the liquid-phase product of cyclic carbonization was higher than 60%, and phosphorus was enriched in the carbonization liquid.

Figure 2:
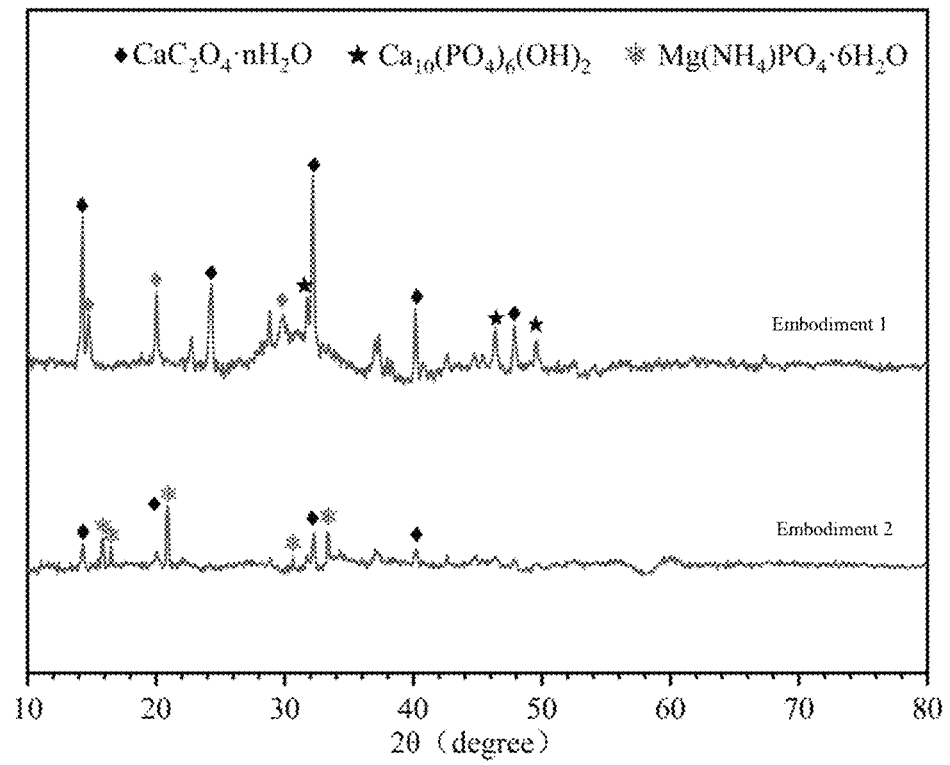
FIG. 2 is an XRD pattern of a phosphorus crystal product in an Example of the present invention.
Figure 3:
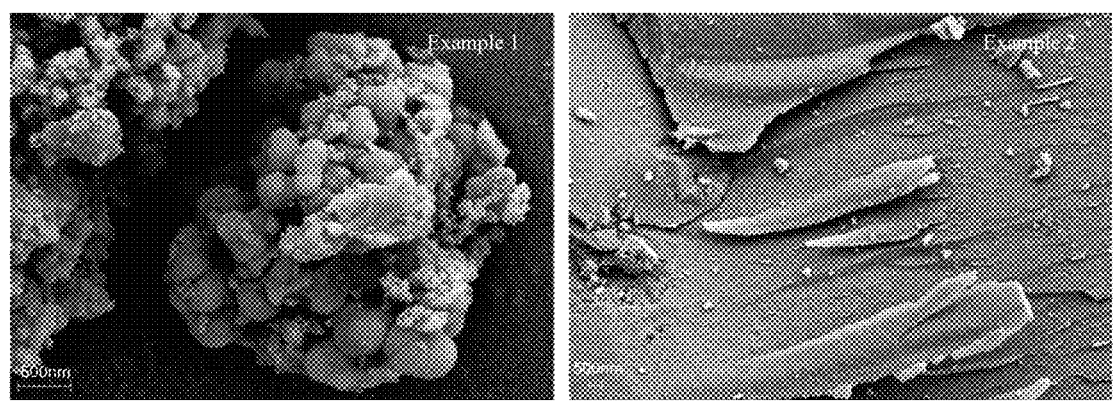
FIG. 3 shows scanning electron microscope images of a phosphorus crystal product in an Example of the present invention.

The phosphorus crystal products in Examples 1 and 2 were determined to obtain an XRD pattern, as shown in FIG. 2. In the crystal product of Example 1, the main crystals were $CaC_2O_4 \cdot nH_2O$ and $Ca_{10}(PO_4)_6(OH)_2$(HAP). In the crystal product of Example 2, the main crystals were $Mg(NH_4)PO_4 \cdot 6H_2O$(MAP) and $CaC_2O_4 \cdot nH_2O$. Compared with Example 1, the content of $CaC_2O_4 \cdot nH_2O$ in the crystals obtained in Example 2 was significantly decreased. This is because excessive $SO_4^{2-}$ existed in the sulfuric acid phase and reacted with $Ca^{2+}$ during the hydrothermal carbonization process to produce $CaSO_4$ precipitates, so that the content of $Ca^{2+}$ in the carbonization liquid was reduced. The reduction of Ca content is conducive to the formation of MAP. By observing the scanning electron microscope images of the phosphorus crystal products in Examples 1 and 2, as shown in FIG. 3, it can be seen that the apparent morphologies of the two crystal products are significantly different. The phosphorus crystal product obtained in Example 1 is mainly composed of irregularly shaped particle clusters and some spherical-like particles, and the phosphorus crystal product obtained in Example 2 shows lamellar and acicular structures with different sizes and shapes.

TABLE 1

Phosphorus Content in Cyclic Carbonization Products of Examples 1 and 2

| Examples | Number of cycles | Hydrochar yield (%) | Total phosphorus content in hydrochar (mg/g) | Inorganic phosphorus content in hydrochar (mg/g) | Total phosphorus content in carbonization liquid (mg/L) | Inorganic phosphorus content in carbonization liquid (mg/L) |
|---|---|---|---|---|---|---|
| Example 1 | 1 | 48.75 ± 2.54 | 5.39 ± 0.08 | 5.18 ± 0.09 | 160.79 ± 2.11 | 157.01 ± 4.68 |
|  | 2 | 54.24 ± 1.72 | 4.85 ± 0.13 | 4.11 ± 0.09 | 379.00 ± 2.03 | 346.17 ± 4.05 |
|  | 3 | 55.10 ± 1.98 | 6.08 ± 0.10 | 5.13 ± 0.09 | 433.05 ± 3.10 | 386.70 ± 4.05 |
|  | 4 | 58.37 ± 2.35 | 6.27 ± 0.13 | 5.33 ± 0.09 | 409.40 ± 2.03 | 366.44 ± 4.05 |
|  | 5 | 56.03 ± 1.73 | 5.47 ± 0.18 | 4.37 ± 0.09 | 550.60 ± 3.10 | 492.10 ± 0.00 |
| Example 2 | 1 | 55.85 ± 2.04 | 3.33 ± 0.18 | 3.30 ± 0.03 | 278.34 ± 8.44 | 276.09 ± 5.16 |
|  | 2 | 56.78 ± 2.37 | 4.21 ± 0.10 | 3.85 ± 0.02 | 425.62 ± 8.78 | 400.76 ± 2.34 |
|  | 3 | 61.25 ± 2.34 | 6.72 ± 0.18 | 6.09 ± 0.09 | 480.34 ± 4.05 | 429.13 ± 3.10 |
|  | 4 | 63.85 ± 1.59 | 8.55 ± 0.13 | 7.05 ± 0.15 | 452.64 ± 5.85 | 426.29 ± 5.85 |
|  | 5 | 60.73 ± 1.76 | 7.04 ± 0.13 | 6.55 ± 0.09 | 540.47 ± 4.78 | 496.89 ± 5.85 |

Example 3 Detection of Heavy Metal Content in Cyclic Carbonization Liquid and Crystal Products The heavy metal contents in the carbonization liquids and crystal products obtained in Examples 1 and 2 were detected, and results were shown in Table 2 and Table 3.

The presence of heavy metals is a main potential obstacle to the application of the hydrothermal carbonization process. In general, Hg and As included in solid waste tend to form aerosol particles during heat treatment due to high volatility, while elements with low volatility, such as Zn, Pb, Cr and Ni, remain in the hydrochar and the carbonization liquid. Arsenic, zinc, cadmium and nickel were detected in the hydrothermal carbonization liquid, but cadmium and arsenic were hardly detected in the resulting crystal products. Cr, Cu and As were detected in the raw material of *Ceratophyllum demersum* L., with the contents of 25.00 mg/kg, 6.75 mg/kg and 43.75 mg/kg respectively, but were not detected in the crystal product because the heavy metals were fixed in the hydrochar due to adsorption or precipitation effect. The concentrations of the heavy metals tested all comply with the limit standards stipulated in "Limit Requirements of Toxic and Harmful Substances in Fertilizers" (GB 38400-2019). This indicates that the crystal product formed by the hydrothermal carbonization liquid is safe and feasible to be used as fertilizers. Compared with the direct use of the raw material of *Ceratophyllum demersum* L., the bioavailability and the environmental risks of the heavy metals in phosphorus recovery products are significantly reduced and it is safer to apply the crystal products prepared from phosphorus-rich hydrothermal carbonization liquid as phosphate fertilizers.

TABLE 2

Heavy Metal Content in Cyclic Carbonization Liquid in Examples 1 and 2

| Samples | As | Zn | Cd | Ni | Cr | Cu | Hg | Pb |
|---|---|---|---|---|---|---|---|---|
|  | (mg/L) | | | | | | | |
| Example 1 | 2.93 | 8.15 | 0 | 0.78 | 0 | 0 | 0 | 0 |
| Example 2 | 0 | 5.47 | 0.10 | 7.75 | 0 | 0 | 0 | 0 |

TABLE 3

Heavy Metal Content in Crystal Products in Examples 1 and 2

| Samples | Zn | Ni | Cd | Cr | Cu | Hg | Pb | As |
|---|---|---|---|---|---|---|---|---|
|  | (mg/g) | | | (mg/kg) | | | | |
| Example 1 | 0.36 | 0.06 | 0 | 0 | 0 | 0 | 0 | 0 |
| Example 2 | 0.24 | 0.07 | 0.62 | 0 | 0 | 0 | 0 | 0 |

Example 4

*Canna indica* L. harvested from constructed wetland was selected as raw material, washed with water until clean, air-dried for one week, dried in an oven at 80° C. to a constant weight and then ground with a crusher. The ground powder was screened through a 40-mesh sieve. The powder of *Canna indica* L. was taken as the raw material. The raw material was mixed with deionized water in a fixed ratio of 1:10, placed in a hydrothermal reactor, then heated to a preset temperature of 200° C., held for 2 h, and then naturally cooled to room temperature. Then, a solid-phase product and a liquid-phase product were separated. The solid-phase product was dried and then crushed to obtain hydrochar, and the liquid-phase product was carbonization liquid.

In the present example, the total phosphorus content in the biomass raw material of *Canna indica* L. was 2.70 mg/g. It was determined that the recovery rate of phosphorus in the solid-phase product was 4.87%, which indicates that phosphorus migrates to the liquid-phase product during the hydrothermal carbonization process of wetland plant-based biomass, but the degree of migration varies according to different types of the raw material.

Example 5

*Canna indica* L. harvested from constructed wetland was selected as raw material, washed with water until clean, air-dried for one week, dried in an oven at 80° C. to a constant weight and then ground with a crusher. The ground powder was screened through a 40-mesh sieve. The powder of *Canna indica* L. was taken as the raw material. The raw material was mixed with deionized water in a fixed ratio of 1:10, placed in a hydrothermal reactor, then heated to a preset temperature of 220° C., held for 2 h, and then naturally cooled to room temperature. Then, a solid-phase product and a liquid-phase product were separated. The solid-phase product was dried and then crushed to obtain hydrochar, and the liquid-phase product was carbonization liquid.

It was determined that the recovery rate of phosphorus in the solid-phase product in the present example was 10.65%, which indicates that phosphorus migrates to the liquid-phase product during the hydrothermal carbonization process of wetland plant-based biomass, but the degree of migration varies according to the differences of hydrothermal carbonization temperature.

Example 6

*Canna indica* L. harvested from constructed wetland was selected as raw material, washed with water until clean, air-dried for one week, dried in an oven at 80° C. to a constant weight and then ground with a crusher. The ground powder was screened through a 40-mesh sieve. The powder of *Canna indica* L. was taken as the raw material. The raw material was mixed with deionized water in a fixed ratio of 1:10, placed in a hydrothermal reactor, then heated to a preset temperature of 240° C., held for 2 h, and then naturally cooled to room temperature. Then, a solid-phase product and a liquid-phase product were separated. The solid-phase product was dried and then crushed to obtain hydrochar, and the liquid-phase product was carbonization liquid.

It was determined that the recovery rate of phosphorus in the solid-phase product in the present example was 34.80%, which indicates that phosphorus migrates to the liquid-phase product during the hydrothermal carbonization process of wetland plant-based biomass, but the degree of migration varies according to the differences of hydrothermal carbonization temperature.

Example 7

*Canna indica* L. harvested from constructed wetland was selected as raw material, washed with water until clean, air-dried for one week, dried in an oven at 80° C. to a constant weight and then ground with a crusher. The ground powder was screened through a 40-mesh sieve. The powder of *Canna indica* L. was taken as the raw material. The raw material was mixed with deionized water in a fixed ratio of 1:5, placed in a hydrothermal reactor, then heated to a preset temperature of 200° C., held for 2 h, and then naturally cooled to room temperature. Then, a solid-phase product and a liquid-phase product were separated. The solid-phase product was dried and then crushed to obtain hydrochar, and the liquid-phase product was carbonization liquid.

It was determined that the recovery rate of phosphorus in the solid-phase product in the present example was 8.50%, which indicates that phosphorus migrates to the liquid-phase product during the hydrothermal carbonization process of wetland plant-based biomass, but the degree of migration varies according to different solid-liquid ratios between the hydrothermal carbonization raw material and the liquid medium.

Example 8

*Canna indica* L. harvested from constructed wetland was selected as raw material, washed with water until clean, air-dried for one week, dried in an oven at 80° C. to a constant weight and then ground with a crusher. The ground powder was screened through a 40-mesh sieve. The powder of *Canna indica* L. was taken as the raw material. The raw material was mixed with deionized water in a fixed ratio of 1:20, placed in a hydrothermal reactor, then heated to a preset temperature of 200° C., held for 2 h, and then naturally cooled to room temperature. Then, a solid-phase product and a liquid-phase product were separated. The solid-phase product was dried and then crushed to obtain hydrochar, and the liquid-phase product was carbonization liquid.

It was determined that the recovery rate of phosphorus in the solid-phase product in the present example was 2.18%, which indicates that phosphorus migrates to the liquid-phase product during the hydrothermal carbonization process of wetland plant-based biomass, but the degree of migration varies according to different solid-liquid ratios between the hydrothermal carbonization raw material and the liquid medium.

Reference Example 1

The basic working conditions of reference example 1 are the same as those of Example 1. The only difference is that the initial liquid-phase medium for hydrothermal carbonization is 1 mol/L sodium hydroxide solution, and the number of cycles is 3.

It was determined that the total phosphorus content in the first-stage carbonization liquid in this reference example was 28.77 mg/L, the total phosphorus content in the hydrochar was 9.54 mg/g, and the recovery rate of phosphorus in the solid-phase product was 80.78%. This indicates that a higher pH value will promote the precipitation effect of phosphorus and cations, thereby enriching phosphorus in hydrothermal biochar and inhibiting the migration of phosphorus to the liquid-phase product. In this reference example, after third-stage cyclic carbonization, the total phosphorus content in the liquid-phase product was only 57.18 mg/L, which is much lower than the total phosphorus content in the liquid-phase products in Example 1 and Example 2.

Reference Example 2

*Ceratophyllum demersum* L. harvested from constructed wetland was selected as raw material, washed with water until clean, air-dried for one week, dried in an oven at 80° C. to a constant weight and then ground with a crusher. The ground powder was screened through a 40-mesh sieve. The powder of *Canna indica* L. was taken as the raw material. The raw material was mixed with deionized water in a fixed ratio of 1:10, placed in a hydrothermal reactor, then heated to a preset temperature of 260° C., held for 2 h, and then naturally cooled to room temperature. Then, a solid-phase product and a liquid-phase product were separated. The solid-phase product was dried and then crushed to obtain hydrochar, and the liquid-phase product was carbonization liquid.

It was determined that the recovery rate of phosphorus in the solid-phase product in this reference example was 91.64%, which indicates that increasing the hydrothermal carbonization temperature can inhibit the migration of phosphorus to the liquid-phase product.

Reference Example 3

The basic working conditions of reference example 3 are the same as those of Example 4. The only difference is that the hydrothermal carbonization temperature is 260° C.

It was determined that the recovery rate of phosphorus in the solid-phase product in this reference example was 70.20%, which indicates that increasing the hydrothermal carbonization temperature can inhibit the migration of phosphorus to the liquid-phase product.

Reference Example 4

*Canna indica* L. harvested from constructed wetland was selected as raw material, washed with water until clean, air-dried for one week, dried in an oven at 80° C. to a constant weight and then ground with a crusher. The ground powder was screened through a 40-mesh sieve. The powder of *Canna indica* L. was taken as the raw material. The raw material was mixed with 0.015 mol/L calcium chloride solution in a fixed ratio of 1:10, placed in a hydrothermal reactor, then heated to a preset temperature of 200° C., held for 2 h, and then naturally cooled to room temperature. Then, a solid-phase product and a liquid-phase product were separated. The solid-phase product was dried and then crushed to obtain hydrochar, and the liquid-phase product was carbonization liquid.

It was determined that the recovery rate of phosphorus in the solid-phase product in the reference example was 47.22%, which indicates that the addition of calcium chloride causes that most of free phosphorus in the liquid-phase medium is fixed in the hydrochar and calcium ions can enhance the enrichment effect of phosphorus in the hydrochar and increase the recovery rate of phosphorus in the solid-phase product, thereby inhibiting the migration of phosphorus to the liquid-phase product.

Reference Example 5

*Eichhornia crassipe* harvested from constructed wetland was selected as raw material, washed with water until clean, air-dried for one week, dried in an oven at 80° C. to a constant weight and then ground with a crusher. The ground powder was screened through a 40-mesh sieve. The powder of *Eichhornia crassipe* was taken as the raw material. The raw material was mixed with deionized water in a fixed ratio of 1:10, placed in a hydrothermal reactor, then heated to a preset temperature of 200° C., held for 2 h, and then naturally cooled to room temperature. Then, a solid-phase product and a liquid-phase product were separated. The solid-phase product was dried and then crushed to obtain hydrochar, and the liquid-phase product was carbonization liquid.

The total phosphorus content in the biomass raw material of *Eichhornia crassipe* in this reference example was 2.20 mg/g. It was determined that the recovery rate of phosphorus in the solid-phase product was 79.85%, which indicates that the degree of migration of phosphorus to the liquid-phase product during the hydrothermal carbonization process of wetland plant-based biomass varies according to different types of the raw material.

The invention claimed is:
1. A method for recovering phosphorus based on cyclic hydrothermal carbonization of wetland plants, comprising the following steps:
   (1) washing, drying, pulverizing and sieving harvested wetland plants;
   (2) adding biomass powder of the wetland plants to a liquid-phase medium for hydrothermal carbonization treatment to obtain a hydrothermal carbonization product;
   (3) performing solid-liquid separation on the carbonization product obtained in step (2) to collect a solid-phase product and a liquid-phase product;
   (4) mixing the carbonization liquid obtained in step (3), as the liquid-phase medium, with the biomass powder of the wetland plants for multi-stage cyclic carbonization, and after the multi-stage cyclic carbonization is completed, conducting solid-liquid separation to obtain cyclic hydrochar and phosphorus-rich carbonization liquid; and
   (5) adjusting a pH of the phosphorus-rich carbonization liquid obtained in step (4) to form and recover phosphorus crystal precipitates, wherein
   the wetland plants are one or more selected from *Ceratophyllum demersum* L., *Canna indica* L., *Acorus calamus* L. and Thalia *dealbata*,
   in step (2), a mass ratio of the biomass to the liquid-phase medium is 1:5-20, a carbonization temperature is 200° C.-240° C., a holding time is 1-3 h, and a stirring speed is 80-120 rpm,
   in step (2), the liquid-phase medium is water or a 0.5-2 mol/L sulfuric acid solution,
   in step (3), the solid-phase product is the hydrochar, and the liquid-phase product is the carbonization liquid,
   in step (4), a number of stages of the cyclic carbonization is 1-6, and
   in step (5), the phosphorus-rich carbonization liquid is adjusted to a pH of 9.5, stirred at the pH at a rotational speed of 100 r/min for 1 h, allowed to stand for 1 h upon completion of reaction, and the precipitates are collected, washed with distilled water 2-3 times, and dried in a constant temperature drying oven at 50° C. for more than 48 h until the precipitates have a constant weight.

* * * * *